(12) United States Patent
Cirulli et al.

(10) Patent No.: US 7,660,723 B2
(45) Date of Patent: Feb. 9, 2010

(54) RANKING METHOD AND SYSTEM

(75) Inventors: Susan Bumgardner Cirulli, Simpsonville, SC (US); Andrew Coleman, Vestal, NY (US); Gautam Majumdar, Wappingers Falls, NY (US); So Ying Tse, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 11/560,885

(22) Filed: Nov. 17, 2006

(65) Prior Publication Data

US 2008/0120120 A1 May 22, 2008

(51) Int. Cl.
*G06F 17/60* (2006.01)
(52) U.S. Cl. .......................................................... 705/1
(58) Field of Classification Search ...................... 705/1
See application file for complete search history.

(56) References Cited

U.S. PATENT DOCUMENTS

| | | | |
|---|---|---|---|
| 5,197,004 A | 3/1993 | Sobotka et al. | |
| 5,416,694 A | 5/1995 | Parrish et al. | |
| 6,275,812 B1 | 8/2001 | Haq et al. | |
| 6,289,340 B1* | 9/2001 | Puram et al. | 707/5 |
| 6,742,002 B2 | 5/2004 | Arrowood | |
| 7,080,057 B2 | 7/2006 | Scarborough et al. | |
| 7,437,309 B2* | 10/2008 | Magrino et al. | 705/11 |
| 2001/0042038 A1* | 11/2001 | Phatak | 705/37 |
| 2004/0267554 A1* | 12/2004 | Bowman et al. | 705/1 |
| 2006/0212305 A1* | 9/2006 | Bogle et al. | 705/1 |

* cited by examiner

*Primary Examiner*—John G Weiss
*Assistant Examiner*—Maame Ofori-Awuah
(74) *Attorney, Agent, or Firm*—Schmeiser, Olsen & Watts; William E. Schiesser

(57) ABSTRACT

A ranking method and system. The method includes receiving by a computing system from a first user, a selection for a first candidate skill. The first user is presented with a first group of predetermined criteria. The first group is associated with the first candidate skill. The first user assigns ranking percentage data associated with the first group. A list including portions of the assigned ranking percentage data assigned to each predetermined criteria of the first group is transmitted to a second user. The computing system receiving from the second user a list of candidates and responses to each predetermined criteria of the first group. The computing system receives from the first user, evaluation data related to the responses. The computing system ranks the candidates of the list based on the assigned ranking percentage data and the evaluation data.

35 Claims, 16 Drawing Sheets

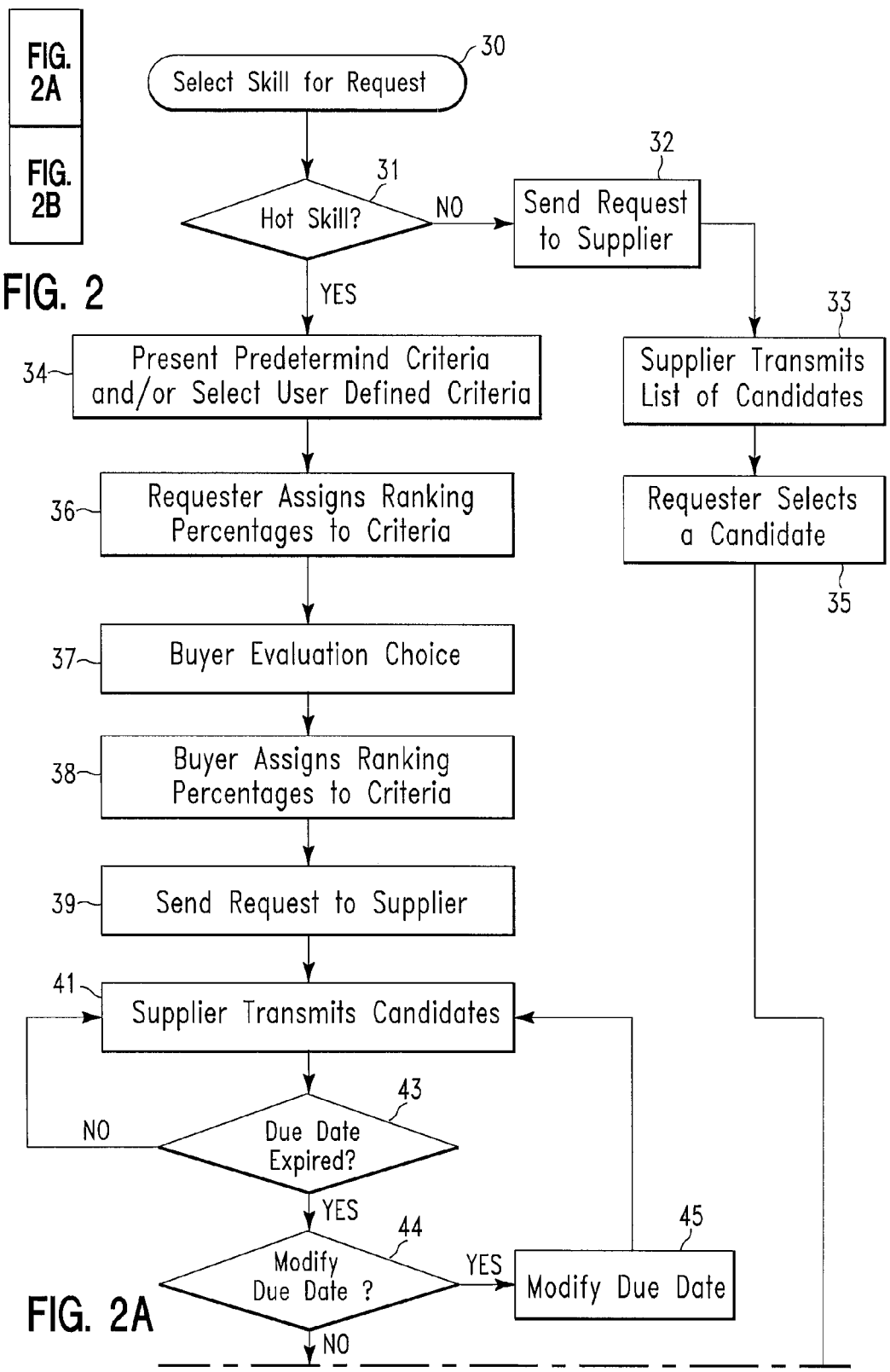

Technical Service Skill Request (000076711)

Competitive skills selected: Application Developer (Java)

You will be asked to rate responses to your request based on the factors(and weight) provided below.
Select "No" for the Buyer Evaluation andclick "Saveand continue" If you choose not to rate the response.

| Criteria | Weight to apply |
|---|---|
| Pricing: ☐ | 25 % |
| Pre-defined criteria 1: ☐ | 10 % |
| Pre-defined criteria 2: ☐ | 10 % |
| Pre-defined criteria 3: ☐ | 10 % |
| Custom criteria 1: | 25 % |
| Custom criteria 1: | 20 % |
| Total: | 100 % |
| Buyers Evaluation: | ⊙ Yes  ○ No |

[Save and continue]

FIG. 4

Service details-Application Developer (Java)

Resource summary

This is a summary of the service you requested. View responses for this service.

| Job category and role |  |
|---|---|
| Primary job category: | Information Technology Services |
| Secondary job category: | IT Specialist |
| Job role: | Application Developer (Java) |
| Skill leve: | Master |
| Quantity: | 1 |
| Industry: | N/A |
| Years of experience: | 5 |
| Education requirements: | None |
| Suppliers: | Multiple suppliers |

| Core skills for Application Developers | Level required |
|---|---|
| Use Library Management Tools | Level 3 |
| Use Application Development Methodologies & Tools | Level 5-Expert |
| Use Programming Language | Level 5-Expert |

| Secondary/Complementary skills | Level required |
|---|---|
| Skill description 0001 | 1-Familiar |
| Skill description 0002 | 1-Familiar |

| Work location |  |
|---|---|
| Country | USA |
| Street address | 5 North Street |
| City | Endicott |
| State | NY |

| Position details |  |
|---|---|
| Will this resource be filling a new position? | Yes, this position is new. |
| Work to be performed at: | On location |
| Work shift: | 1st shift |

| Dates and hours |  |
|---|---|
| Start date: | 04 OCT 2004 |
| End date: | 04 OCT 2005 |

| Candidate ID | Requester rating | Delegate rating | Buyer rating | Average rating |
|---|---|---|---|---|
| Candidate identifier 001 | 8 | Rated | Rated | Not finalized |
| Candidate identifier 002 | Edit rating | Rated | Not rated | Not finalized |
| Candidate identifier 003 | Edit rating | Rated | Not rated | Not finalized |
| Candidate identifier 004 | Edit rating | Not rated | Not rated | Not finalized |

FIG. 5

Skill candidate 002

Required fields are marked with an (*) and must be filled in to complete the form.

| Candidate information | |
|---|---|
| First name: | Candidate |
| Middle name: | X |
| Last name: | A |
| Supplier: | Supplier name |
| Citizenship: | Supplier certifies that the candidate is a United states citizen. |
| Candidate resume: | Candidate A resume. doc ←—605 |

| | | |
|---|---|---|
| Start date | 11/01/2004 | 11/01/2004 |
| End date | 11/01/2005 | 11/01/2005 |

| Core shift for Application Developers | Level requested | Candidate level |
|---|---|---|
| Use Library Management Tools | Level 3 | Level 3 |
| Use Application Development Methodologies & Tools | Level 5-Expert | Level 5-Expert |
| Use Programming Language | Level 5-Expert | Level 5-Expert |

| Secondary/complementary skill | Level requested | Candidate evel |
|---|---|---|
| Skill description 0001 | 1-Familiar | 1-Familiar |
| Skill description 0002 | 1-Familiar | 1-Familiar |

| Criteria | Supplier response | Your rating |
|---|---|---|
| Competitive bid question #1 | Answer #1 | [ v ] —602 |
| Competitive bid question #2 | Answer #2 | [ v ] |
| Competitive bid question #3 —604 | Answer #3 | [ v ] |
| Competitive bid question #4 | Answer #4 | [ v ] |
| Competitive bid question #5 | Answer #5 | [ v ] |

601—[Save and return]   [Cancel]

| Responses for skill | | | | |
|---|---|---|---|---|

Because Application Developer (Java) is a constrained skill, the competitive bid process requires that you rate the service providers on saveral dimensions prior to selecting any candidates for thi service.
Pricing is not included until the ratings are finished.

Click the candidate identifier or rated value to candidate's details and/or
rate the candidate

| Candidate ID | Requester rating | Delegate rating | Buyer rating | Average rating |
|---|---|---|---|---|
| Candidate identifier 001 | Rated | Rated | 8 | Not finalized |
| Candidate identifier 002 | Rated | Rated | 5 | Not finalized |
| Candidate identifier 003 | Rated | Rated | 0 | Not finalized |
| Candidate identifier 004 | Rated | Rated | 4 | Not finalized |

Finalize ratings ~704

*Ratings must be finalized before you will be able to select candidates.

Return to request

FIG. 7

| Responses for skill | | | | | | | |
|---|---|---|---|---|---|---|---|

Because Application Developer (Java) is a constrained skill, the competitive bid process requires that you rate the service providers on several dimensions prior to selecting Non-finalisthcandidates

| Select | Candidate ID | Rank | Average | Requester | Delegate | Buyer | Pricing | Status |
|---|---|---|---|---|---|---|---|---|
| ☐ | Candidate identifier 001 | 1 | 8.4 | 8 | 8 | 9 | 55 | |
| ☐ | Candidate identifier 002 | 2 | 6.5 | 5 | 6 | 5 | 55 | |
| ☐ | Candidate identifier 003 | 3 | 6.3 | 9 | 9 | 10 | 62 | |
| ☐ | Candidate identifier 004 | 4 | 4.4 | 4 | 3 | 2 | 55 | |

[Add selected to finalists]  [Reject selected]

Finalist candidates

| Select | Candidate ID | Rank | Average | Requester | Delegate | Buyer | Pricing | Status |
|---|---|---|---|---|---|---|---|---|

No candidates have been added to the finalist list.

[Submit selected]  [Remove selected from finalists]

Terms of use                                                   [Return to request]

| Responses for skill | | | | | | | |
|---|---|---|---|---|---|---|---|

Select candidates and add them to your list of "finalists," from which you'll perform any further processing.

Non-finalisthcandidates

| Select | Candidate ID | Rank | Average | Requester | Delegate | Buyer | Pricing | Status |
|---|---|---|---|---|---|---|---|---|
| ☐ | Candidate identifier 003 | 1 | 8.4 | 8 | 8 | Not rating | 55 | |
| ☐ | Candidate identifier 002 | 2 | 6.5 | 5 | 6 | Not rating | 55 | |
| ☐ | Candidate identifier 001 | 3 | 6.3 | 9 | 9 | Not rating | 62 | |
| ☐ | Candidate identifier 004 | 4 | 4.4 | 4 | 3 | Not rating | 55 | |

[Add selected to finalists]  [Reject selected]

Finalist candidates

| Select | Candidate ID | Rank | Average | Requester | Delegate | Buyer | Pricing | Status |
|---|---|---|---|---|---|---|---|---|

No candidates have been added to the finalist list.

[Submit selected]  [Remove selected from finalists]

Terms of use                                                   [Return to request]

The primary skill selected (Business Analyst ( JCL )) is a Competitive skill.

| Criteria | Weight to apply |
|---|---|
| Pricing: ☐ | 25 % |
| Availability (respond with a start date): | 25 % |
| Citizenship (response with country of citizenship): | 15 % |
| Customer facing experience (rate 1-10 with 10 being most experienced): | 15 % |
| Education (rate 1-10 with being highly educated): | 0 % |
| Project experience (rate 1-10 with 10 being most experience): | 10 % |
| Technical interview (rate 1-10 with being highly educated): | 0 % |
| | |
| Knowledge of Excel — 140 | 10 % |
| | % |
| *Total: | 100 % [Calculate total] |

135 points to the Criteria list; 130 points to the Weight column.

[Previous] [Continue] [Save draft]

FIG. 10

| Competitive evaluation criteria and weights | |
|---|---|
| Criteria | Weight to apply |
| Pricing: | 25 % |
| Availability (respond with a start date): | 25 % |
| Citizenship (response with country of citizenship): | 15 % |
| Customer facing experience (rate 1-10 with 10 being most experienced): | 15 % |
| Education (rate 1-10 with being highly educated): | 0 % |
| Project experience (rate 1-10 with 10 being highest experience): | 10 % |
| Technical interview (rate 1-10 with being best) | 0 % |
| Knowledge of Excel | 10 % |
| *Total: | 100 % Calculate total |

Because this request is a "hot skill," you must indicate whether you will participate in the supplier evaluation process.

Buyer participation: ⦿ I will participate in the evaluation of supplier responses,
(You will need to evaluate all of the responses to this request before the requestor can select a response.)

○ I will NOT participate in the evaluation of supplier responses,
(The ranking of responses will be based on the requester's ratings.)

[Save and continue] [Cancel]

Competitive evaluation criteria

Because the requested skill is a "hot skill," you will need to provide answers to the following question.

149 ↘

| Criteria | Response |
|---|---|
| Knowledge of excel* | Very well |
| Availability (respond with a start date)* | asap |
| Citizenship (response with country of citizenship)* | US |
| Customer facing experience (rate 1-10 with 10 being most experienced)* | 8 |
| Project experience (rate 1-10 with 10 being highest experience)* | 8 |

| Criteria | Supplier response | Your rating |
|---|---|---|
| Knowledge of excel | Very well | 9 |
| Availability (respond with a start date) | asap | 10 |
| Citizenship (response with country of citizenship) | US | 10 |
| Customer facing experience (rate 1-10 with 10 being most experienced) | 8 | 8 |
| Project experience (rate 1-10 with 10 being highest experience) | 8 | 8 |

FIG. 13  150

Responses for skill

Because Business Analyst (JCL) is a constrained skill, the competitive evaluation process requires that you rate the service provider on several dimensions prior to selecting any responses for this service. Pricing is not included until the ratings are finalized.

Click any link below, to view the response details and/or rate response

| Candidate identification | Supplier | Requester rating | Project coordinator rating | Buyer rating | Average rating |
|---|---|---|---|---|---|
| Mime Doe | Test Vendor 1 | 6.25 | Not rated | Not rated | Not finalized |
| Steve Doe | Test Vendor 1 | 6.8 | Not rated | Not rated | Not finalized |
| Doe John | Test Vendor 1 | 6.9 | Not rated | Not rated | Not finalized |
| Jane Doe | Test Vendor 1 | 5.0 | Not rated | Not rated | Not finalized |

Finalize

Responses for skill

Because Business Analyst (JCL) is a constrained skill, the competitive evaluation process required that you rate the service provider on several dimensions prior to selecting any responses for this service. Pricing is not included until the ratings are finalized.

Click any link below, to view the response details and/or rate response

| Candidate Identification | Supplier | Requester rating | Project coordinator rating | Buyer rating | Average rating |
|---|---|---|---|---|---|
| Mime Doe | Test Vendor 1 | 6.25 | Not rated | Not rated | Not finalized |
| Steve Doe | Test Vendor 1 | 6.8 | Not rated | Not rated | Not finalized |
| Doe John | Test Vendor 1 | 6.9 | Not rated | Not rated | Not finalized |
| Jane Doe | Test Vendor 1 | 5.0 | Not rated | Not rated | Not finalized |

Finalize

Finalized result with ranking:

Responses for skill

Select responses and add them to your list of "finalist." from which you'll perform any further processing. click on a candidate name to view skill response detail, open and view attachments and/or email candidate information (including attachments).

Non-finalized responses

| Select | Candidate Identification | Rank | Average | Requester | Project coordinator (has all capabilities of requester) | Buyer | Pricing (USD/Hour) | Status |
|---|---|---|---|---|---|---|---|---|
| ☐ | Doe John | 1 | 9.40 | 6.9 | 0.0 | 0.0 | 60.00 | Submitted/ non-finalist |
| ☐ | Steve Doe | 2 | 8.80 | 6.8 | 0.0 | 0.0 | 80.00 | Submitted/ non-finalist |
| ☐ | Mime Doe | 3 | 8.50 | 6.25 | 0.0 | 0.0 | 69.00 | Submitted/ non-finalist |
| ☐ | Jane Doe | 4 | 7.25 | 5.0 | 0.0 | 0.0 | 70.00 | Submitted/ non-finalist |

Add selected to finalists     Reject selected

RANKING METHOD AND SYSTEM

FIELD OF THE INVENTION

The present invention relates to a method and associated system for ranking candidates.

BACKGROUND OF THE INVENTION

Selecting a suitable individual to perform functions typically requires a process that may be complicated and inaccurate. Accordingly, there exists a need in the art to overcome the deficiencies and limitations described herein above.

SUMMARY OF THE INVENTION

The present invention provides a ranking method comprising:

presenting, by a computing system, a first list of candidate skills to a first user, said computing system comprising a memory device, said memory device comprising said first list and a second list of predetermined criteria, at least one predetermined criteria of said second list associated with each candidate skill of said first list;

first receiving from said first user, by said computing system, a selection of a first candidate skill from said first list;

presenting to said first user in response to said first receiving, by said computing system, a first group of predetermined criteria from said second list, said first group associated with said first candidate skill;

second receiving from said first user, by said computing system, first assigned ranking percentage data associated with said first group of predetermined criteria;

generating, by said computing system, a third list comprising portions of said first assigned ranking percentage data assigned to each predetermined criteria of said first group of predetermined criteria, wherein said third list further comprises said first group of predetermined criteria;

transmitting, by said computing system, said third list to a second user;

first receiving from said second user, by said computing system, a fourth list of candidates and responses to each said predetermined criteria of said first group, each candidate of said fourth list associated with said first group of predetermined criteria of said third list;

presenting, by said computing system, said fourth list to said first user;

third receiving from said first user, by said computing system, first evaluation data related to said responses to each said predetermined criteria of said first group;

ranking, by said computing system, said candidates of said fourth list, said ranking based on said first assigned ranking percentage data and said first evaluation data.

The present invention provides a computing system comprising a processor coupled to a computer-readable memory unit, said memory unit comprising a first list of candidate skills, a second list of predetermined criteria, and instructions that when executed by the processor implement a ranking method, at least one predetermined criteria of said second list associated with each candidate skill of said first list, said method comprising:

presenting, by said computing system, said first list of candidate skills to a first user;

first receiving from said first user, by said computing system, a selection of a first candidate skill from said first list;

presenting to said first user in response to said first receiving, by said computing system, a first group of predetermined criteria from said second list, said first group associated with said first candidate skill;

second receiving from said first user, by said computing system, first assigned ranking percentage data associated with said first group of predetermined criteria;

generating, by said computing system, a third list comprising portions of said first assigned ranking percentage data assigned to each predetermined criteria of said first group of predetermined criteria, wherein said third list further comprises said first group of predetermined criteria;

transmitting, by said computing system, said third list to a second user;

first receiving from said second user, by said computing system, a fourth list of candidates and responses to each said predetermined criteria of said first group, each candidate of said fourth list associated with said first group of predetermined criteria of said third list;

presenting, by said computing system, said fourth list to said first user;

third receiving from said first user, by said computing system, first evaluation data related to said responses to each said predetermined criteria of said first group;

ranking, by said computing system, said candidates of said fourth list, said ranking based on said first assigned ranking percentage data and said first evaluation data.

The present invention provides a computer program product, comprising a computer usable medium comprising a first list of candidate skills, a second list of predetermined criteria, and a computer readable program code embodied therein, at least one predetermined criteria of said second list associated with each candidate skill of said first list, said computer readable program code adapted to implement a ranking method within a computing system, said method comprising:

presenting, by said computing system, said first list of candidate skills to a first user;

first receiving from said first user, by said computing system, a selection of a first candidate skill from said first list;

presenting to said first user in response to said first receiving, by said computing system, a first group of predetermined criteria from said second list, said first group associated with said first candidate skill;

second receiving from said first user, by said computing system, first assigned ranking percentage data associated with said first group of predetermined criteria;

generating, by said computing system, a third list comprising portions of said first assigned ranking percentage data assigned to each predetermined criteria of said first group of predetermined criteria, wherein said third list further comprises said first group of predetermined criteria;

transmitting, by said computing system, said third list to a second user;

first receiving from said second user, by said computing system, a fourth list of candidates and responses to each said predetermined criteria of said first group, each candidate of said fourth list associated with said first group of predetermined criteria of said third list;

presenting, by said computing system, said fourth list to said first user;

third receiving from said first user, by said computing system, first evaluation data related to said responses to each said predetermined criteria of said first group;

ranking, by said computing system, said candidates of said fourth list, said ranking based on said first assigned ranking percentage data and said first evaluation data.

The present invention provides a process for supporting computer infrastructure, said process comprising providing at least one support service for at least one of creating, integrating, hosting, maintaining, and deploying computer-readable code in a computing system comprising a memory unit, said memory unit comprising a first list of candidate skills and a second list of predetermined criteria, at least one predetermined criteria of said second list associated with each candidate skill of said first list, wherein the code in combination with the computing system is capable of performing a ranking method, said method comprising:

presenting, by said computing system, said first list of candidate skills to a first user;

first receiving from said first user, by said computing system, a selection of a first candidate skill from said first list;

presenting to said first user in response to said first receiving, by said computing system, a first group of predetermined criteria from said second list, said first group associated with said first candidate skill;

second receiving from said first user, by said computing system, first assigned ranking percentage data associated with said first group of predetermined criteria;

generating, by said computing system, a third list comprising portions of said first assigned ranking percentage data assigned to each predetermined criteria of said first group of predetermined criteria, wherein said third list further comprises said first group of predetermined criteria;

transmitting, by said computing system, said third list to a second user;

first receiving from said second user, by said computing system, a fourth list of candidates and responses to each said predetermined criteria of said first group, each candidate of said fourth list associated with said first group of predetermined criteria of said third list;

presenting, by said computing system, said fourth list to said first user;

third receiving from said first user, by said computing system, first evaluation data related to said responses to each said predetermined criteria of said first group;

ranking, by said computing system, said candidates of said fourth list, said ranking based on said first assigned ranking percentage data and said first evaluation data.

The present invention advantageously provides a method and associated system capable of selecting a suitable individual to perform functions.

BRIEF DESCRIPTION OF THE DRAWINGS

FIG. 4 is an example of a modified computer screen shot from the screen shot of FIG. 3 2, in accordance with embodiments of the present invention.

FIG. 5 illustrates an example of a second computer screen shot associated with the algorithm of FIG. 2, in accordance with embodiments of the present invention.

FIG. 6 illustrates an example of a third computer screen shot associated with the algorithm of FIG. 2, in accordance with embodiments of the present invention.

FIG. 7 illustrates an example of a fourth computer screen shot associated with the algorithm of FIG. 2, in accordance with embodiments of the present invention.

FIG. 8 illustrates an example of a fifth computer screen shot associated with the algorithm of FIG. 2, in accordance with embodiments of the present invention.

FIG. 9 illustrates an example of a sixth computer screen shot associated with the algorithm of FIG. 2, in accordance with embodiments of the present invention.

FIGS. 10-16 illustrate an example of implementation for the system of FIG. 1 for ranking candidates, in accordance with embodiments of the present invention.

DETAILED DESCRIPTION OF THE INVENTION

Figure 1:
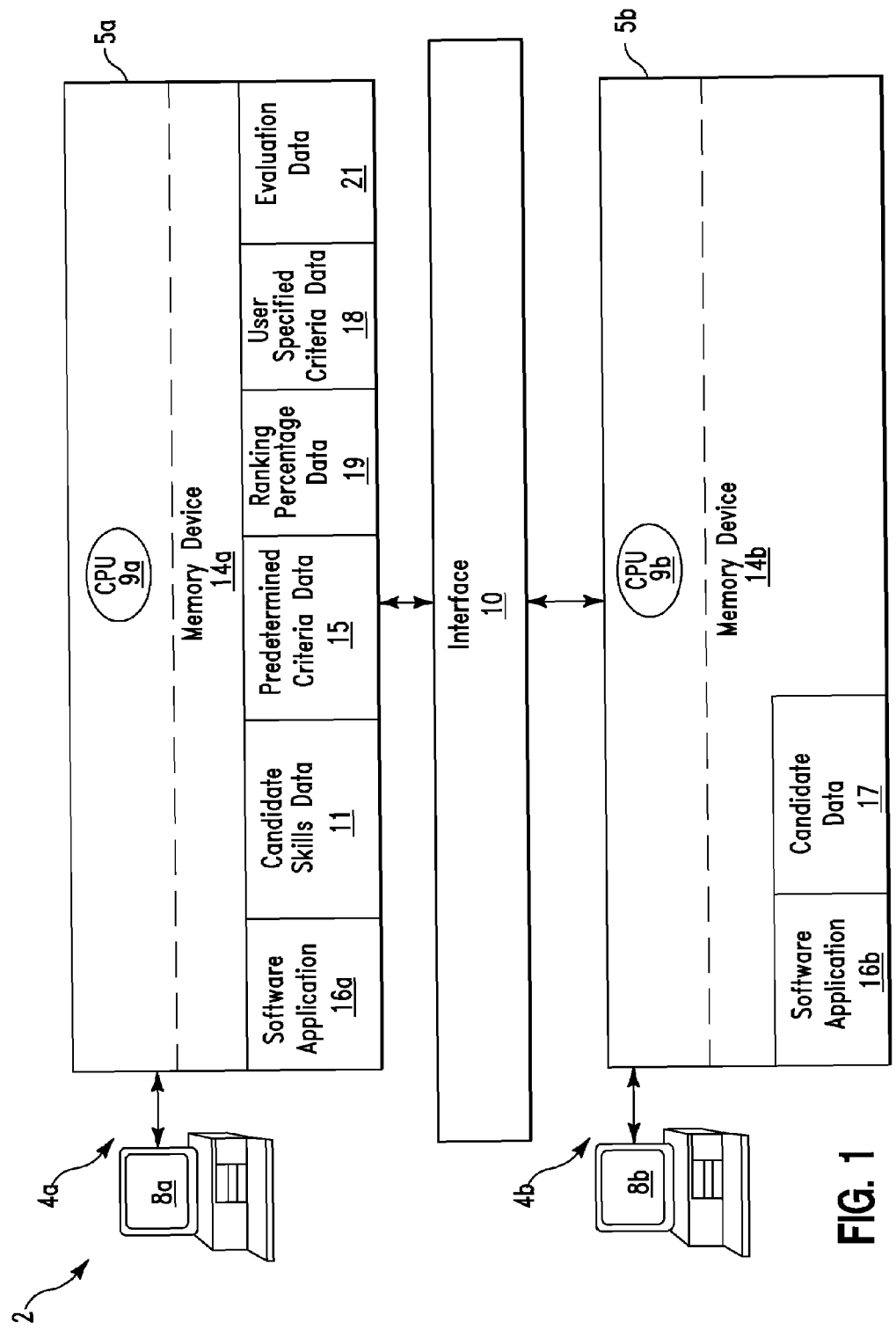
FIG. 1 illustrates a block diagram of a system for ranking candidates for a requester based on a selected skill or skill set, in accordance with embodiments of the present invention.

FIG. 1 illustrates a block diagram of a system 2 for ranking candidates for a requester based on a selected skill or skill set, in accordance with embodiments of the present invention. System 2 may be used in any business process including, inter alia, allowing a user (e.g., a requester using terminal 8*a*) to locate and rank candidates (e.g., contractors, job applicants, etc) for job openings (i.e., skill or skill set). A requester is defined herein as a person/people (e.g., users from an entity such as, inter alia, a company) looking for a resource (i.e., a person/people with a specific skill(s)) to fill an open job position. The requester interacts with a software application (e.g., software application 16*a*) to select a specified candidate skill (e.g., a "hot" or frequently requested skill or high demand skill, such as, inter alia, a Java programmer, etc) related to a job opening. In response to the selected specified candidate skill, the software application (e.g., software application 16*a*) presents a set of predetermined criteria (e.g., in the form of questions) associated with the selected specified candidate skill. Examples of predetermined criteria may include, inter alia, pricing as related to hiring or contracting a candidate, an availability date to start working, educational criteria, industry experience, oral communication skills, project experience, security clearances, technical interview, teamwork skills, willingness to travel, written communication skills, etc. The requester assigns weighted rankings (e.g., in the form of percentages) to each predetermined criteria of the set. The weighted rankings are based on importance (i.e., as determined by the requester) of each predetermined criteria of the set. The predetermined criteria are transmitted to a supplier. A supplier is defined herein as a person at an external entity or company (e.g., an employment agency) capable of satisfying candidate requests. A supplier interacts with a software application (e.g., software application 16*b*) to provide responses to each predetermined criteria and to identify candidates associated with the predetermined criteria and skill identified by the requester. The supplier transmits (i.e., to the requester) a list of candidates associated with the predetermined criteria and requested skill identified by the requester and the responses to each predetermined criteria. The requester evaluates the responses from the supplier and the software application (e.g., software application 16*a*) automatically ranks the list of candidates based on the evaluation (i.e., of the responses) and the weighted rankings for each of the predetermined criteria so that the requester may select a suitable candidate. Additionally, a third party (e.g., a buyer from a same company as the requester) may evaluate the responses from the supplier and the software application (e.g., software application 16*a*) may automatically rank the list of candidates based on the both evaluations (i.e., an average) and the weighted rankings for each of the predetermined criteria.

System 2 comprises a computing system 4a (e.g., a server) connected to a computing system 4b (e.g., a server) through a through an interface 10. Interface 10 may comprise any type of interface known to a person of ordinary skill in the art including, inter alia, a local area network, (LAN), a wide area network (WAN), the Internet, etc. Computing system 4a comprises a computing apparatus 5a and an interface terminal 8a. Computing system 4b comprises a computing apparatus 5b and an interface terminal 8b. Computing apparatus 5a comprises a CPU 9a and a memory device 14a. Alternatively, memory device 14a may be located external to computing apparatus 5a. Memory device 14a comprises a software application 16a, skills data 11, predetermined criteria data 15, ranking percentage data 19, user specified criteria data 18, and evaluation data 21. Candidate skills data 11, predetermined criteria data 15, ranking percentage data 19, user specified criteria data 18, and evaluation data 21 may be inputted into computing apparatus 5a through interface terminal 8a. Computing apparatus 5b comprises a CPU 9b and a memory device 14b. Alternatively, memory device 14b may be located external to computing apparatus 5b. Candidate data 17 (i.e., comprising lists of candidates and responses from the suppliers) may be inputted into computing apparatus 5b through interface terminal 8b. In order to initiate a process for ranking candidates for a requester, computing system 4a presents the requester (i.e., through interface terminal 8a) with a list of skills (i.e., from skills data 11) and the requester selects a skill (e.g., a core job role, etc). Additionally, computing system 4a may present the requester with a list of suppliers (i.e., stored in memory device 14a) and the requester may select a specific supplier from the list. The selected skill is configured as a hot skill. Computing system 4a may determine whether a competitive bid process is configured, based on country/commodity code and hot skill configuration. A commodity code is a code that is used to reference raw material, including, inter alia, labor. The competitive bid process is configured by the country and commodity combination together. In response to the selected specified skill, software application 8a presents (i.e., via an evaluation screen through interface terminal 8a) a set of predetermined criteria (e.g., in the form of questions) associated with the selected specified candidate skill. The specified criteria may be configured by country/service type. A service type is a general grouping of related skills. The requester assigns weighted rankings from ranking percentage data 19 (e.g., in the form of percentages) to each predetermined criteria of the set. The weighted rankings are based on importance (i.e., as determined by the requester) of each predetermined criteria of the set. For each specified criteria, the weighted ranking will be applied to a supplier response (as described, infra) to each criteria. The weighted ranking percentages may be applied as whole numbers and will total 100%. A "Pricing" criteria (i.e., with respect to a candidate) is always present and will be weighted at least 25% (see example 1 described, infra). Additionally, the requester may enter in free-text format up to 2 additional criteria (questions) related to the selected skill. The additional questions will require responses from the supplier. The requester must enter a due date (i.e., into computing system 4a) for responses. When the requester submits into computing system 4a the request (i.e., selected skill with associated specified criteria and weighted rankings), a third party (e.g., a supervisor, a buyer, etc) may be notified of the request. The third party (herein referred to as buyer) may change the due date entered by the requester. The buyer has the option of additionally evaluating candidates (i.e., from the supplier) as well as the requester. The request is now transmitted to the supplier (i.e., via computing system 4b). The supplier may submit candidates up to the due date. If due date has passed, the requester may extend the due date and allow more candidates to be submitted. However, the requester may not select a candidate until after due date has passed and an evaluation is completed. The requester may not mark an evaluation complete until after the due date has passed. Once an evaluation is complete, due date cannot be changed.

If the due date has not passed, the supplier interacts with software application 16b to provide responses to each predetermined criteria and the up to 2 additional criteria. Additionally, the supplier identifies suitable candidates associated with the predetermined criteria and skill identified by the requester and transmits a list of the identified candidates. The supplier transmits (i.e., to the requester via computing system 4a) the list of candidates associated with the predetermined criteria and requested skill identified by the requester and the responses to each predetermined criteria for each candidate. Once a response is received by computing system 4a, software application 16a will enable (i.e., if the due data has not passed) the requester and the buyer (i.e. if the buyer chose to be an evaluator) to assign scores (from 1 to 10) for each of the evaluation criteria (i.e., the responses from the supplier to the predetermined and user specified criteria) for each candidate response received. The buyer may mark his/her evaluation as complete (i.e., after assigning scores to each of the evaluation criteria). Once the buyer marks the evaluation complete, he/she may not change the answers (i.e., the scores). The requester may mark the evaluation as complete (i.e., after assigning scores to each of the evaluation criteria). Once the requester marks the evaluation complete, he/she may not change his/her answers (i.e., the scores). The buyer may see the requester's evaluation, even if the buyer has not elected to evaluate, but only after the requester has marked the evaluation as complete. If the buyer is an evaluator, he/she may see both the requester's and his/her own evaluation, once the buyer has marked the evaluation complete. In contrast, the requester may see only his/her own evaluation. Software application 16a automatically ranks the list of candidates (i.e., from the supplier) based on the evaluation from the requester of the responses (i.e., the assigned scores to the responses from the supplier) and the weighted rankings for each of the predetermined criteria so that the requester may select a suitable candidate. Additionally, software application 16a will average the scores if both the requester and buyer have evaluated (i.e., scored) the candidates and display only the average to the requester. The requester will not see the buyer's scores separately. The buyer will have to authorize the requester's candidate selection, regardless which candidate the requester selects (i.e., best or not). The buyer may reject the requester's candidate selection.

If the due date has passed and the requester does not modify the due date then software application 16a automatically ranks a price criteria for each candidate. The lowest priced candidate gets a highest point total (i.e., 10). All other pricing for candidates is awarded points based on a standard deviation away from a lowest score. Computing system 4a will automatically rank the candidates based on price responses from the supplier, once the due date has passed. An example for implementation of software application 16a for automatically ranking candidates based on price responses from the supplier, once a due date has passed is illustrated in Example 1.

EXAMPLE 1

If a due date is passed, computing system 4a will rank the candidates based on the price responses by the supplier. Computing system 4a will assign the lowest-price candidate a "10" for the price evaluation criteria. Computing system 4a will assign points from 1 to 10 for the pricing evaluation criteria for the other candidates based on the standard deviation of the difference from the lowest price. For example three criteria and assigned weighted rankings have been selected:
1. TECHNICAL ABILITY: 45%
2. AVAILABILITY: 30%
3. PRICING: 25%

All candidates have already received total points for Technical ability and Availability.

Total points=a point for Technical ability*percentage for Technical ability+a point for Availability*percentage Availability.

A point scale of 1-10 is used for pricing. In this example, an average price (i.e., for pricing) is $50/hour. The lowest price receives 10 of 10 points. The remaining candidates receive points based on the standard deviation from the lowest price. In table 1, the standard deviation of $10 is used.

TABLE 1

| Candidate | Current Points | Bill Rate | Score | Pricing Rating |
|---|---|---|---|---|
| Candidate 1 | 7.5 | $30 | 10 | 2.5 |
| Candidate 2 | 7.5 | $40 | 9 | 2.25 |
| Candidate 3 | 7.5 | $45 | 9 | 2.25 |
| Candidate 4 | 7.5 | $50 | 8 | 2 |
| Candidate 5 | 7.5 | $55 | 8 | 2 |
| Candidate 6 | 7.5 | $56 | 8 | 2 |
| Candidate 7 | 7.5 | $60 | 7 | 1.75 |
| Candidate 8 | 7.5 | $61 | 7 | 1.75 |
| Candidate 9 | 7.5 | $55 | 8 | 2 |

The price ranking points will be calculated as follows:
Standard Deviation=a square root of the (sum of $(x-M)2/N-1$), where x=the bill rate, M=a mean of all candidates bill rates, and N=a number of candidate responses received for that skill request.

Score=10-integer of $((x-\text{minimum of (all } x))/\text{standard deviation})$ Price Rating=Score*Pricing percentage The average rating=average of (requester rating, buyer rating if exists, technical coordinator rating if exists)+Price Rating.

A candidate with the highest average rating will be ranked number 1. This process allows a buyer and technical coordinator(s) to evaluate the candidates in the same process as the requester. If the buyer and/or technical coordinator(s) evaluate the candidates, their rating will be calculated the same way as the requester's rating and stored in a database separately. When ranking is done, all the ratings for the same criteria will be averaged and added to the pricing rating to get the final rating.

Figure 2B:
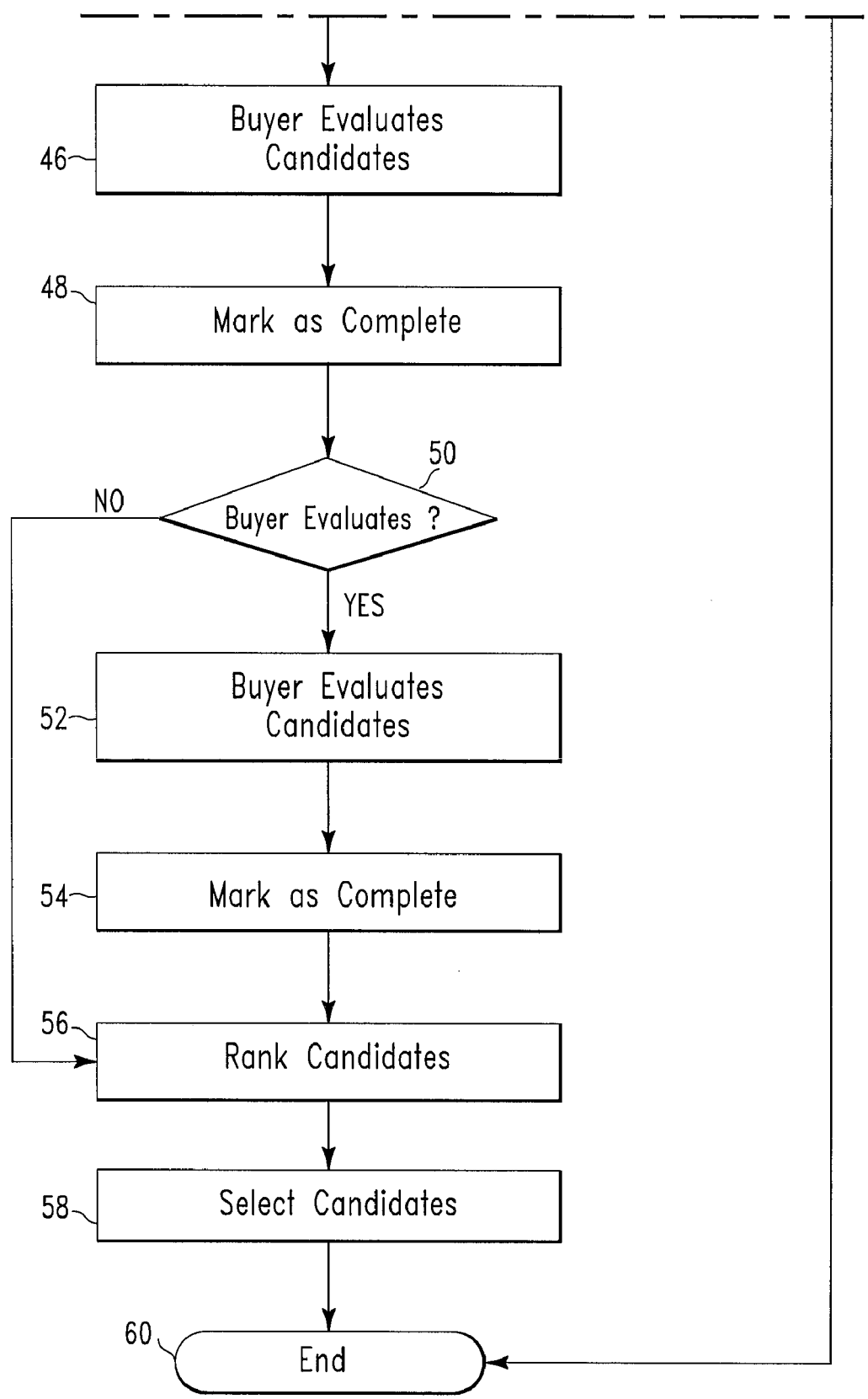
FIG. 2 illustrates a flowchart describing an algorithm used by the system of FIG. 1 for selecting a skill and ranking candidates for the selected skill, in accordance with embodiments of the present invention.

FIG. 2 illustrates a flowchart describing an algorithm used by system 2 of FIG. 1 for selecting a hot skill and ranking candidates for the hot skill, in accordance with embodiments of the present invention. In step 30, a computing system (e.g., computing system 4a in FIG. 1) presents the requester with a list of skills (i.e., from skills data 11) and the requester selects a skill (e.g., a core job role, etc). In step 31, the computing system determines if the requested skill is a hot skill (i.e., a frequently requested skill or high demand skill).

If in step 31, the computing system determines that the requested skill is a hot skill then the computing system enables an evaluation screen (e.g., using interface terminal 8a) for the requester to view. In step 34, the computing system presents a set of predetermined criteria (e.g., in the form of questions) associated with the requested candidate skill. In step 34, the requester is presented with a list of predefined criteria (e.g., to be decided by lines of business) including pricing (with respect to the selected skill) criteria. A line of business is an individual segment of an organization within a company. Additionally, the requester may also supply two additional requester defined criteria (e.g., using write-in fields on interface terminal 8a in FIG. 1). In step 36, the requester assigns ranking percentages (based on importance) to each of the predefined criteria and any additional requester defined criteria. A criteria may have a zero percentage (i.e., for a ranking percentage). The total ranking percentages must add up to 100%. A pricing criteria must have a minimum ranking percentage of 25%. Instructions will be included on the screen for submitting: the predefined criteria, any additional requester defined criteria, and associated ranking percentages. In step 37, the computing system will enable a buyer evaluation choice for a buyer to indicate whether he/she wants to evaluate the supplier responses to the predefined criteria and any additional requester defined criteria. Additionally, the buyer will review, evaluation criteria, due date, and suppliers. In step 38, the buyer may optionally assign another set of ranking percentages to the predefined criteria and any additional requester defined criteria. In step 39, the buyer sends the candidate request (i.e., comprising the requested hot skill, the predefined criteria, any additional requester defined criteria, and associated ranking percentages) to the supplier. In step 41, the supplier transmits candidate names and information to the requester. The candidate names and information may be transmitted until a specified due date. After due date passes, the supplier may no longer submit candidates to the requester. In step 43, the computing system determines if the due date has expired (i.e., passed).

If in step 43, the computing system determines that the due date has not expired then step 41 is repeated until the due date expires.

If in step 43, the computing system determines that the due date has expired then in step 44, the requester and/or buyer determines if the due date should be modified (i.e., extended to a later date).

If in step 43, the requester and/or buyer determines that the due date should be modified then in step 45, the due date is modified and step 41 is repeated.

If in step 43, the requester and/or buyer determines that the due date should not be modified, then in step 46 the requester evaluates the supplier responses and candidates. The evaluation may occur before, at, or after the due date. Additionally, the evaluation may be done individually or all at once. The requester may complete the evaluation of the candidates/responses on a scale of 1-10. They can work on evaluation as candidates are submitted. The requester will not see total scores with pricing until the evaluation is marked as complete. In step 48, the requester will mark the evaluation as complete. In order to mark the evaluation as complete, the requester must evaluate all candidates for each criteria. The requester may not go back and change the evaluation after marking it complete. After the requester marks the evaluation as complete, the computing system will transmit a warning indicating that the evaluation will be completed and allowing the requester to cancel the completion command or continue to mark the evaluation as complete. In step 50, the computing system determines if the buyer has requested to evaluate the candidates/responses (i.e., as indicated in step 37).

If in step 50, the computing system determines that the buyer has not requested to evaluate the candidates/responses then the process jumps to step 56 in order for the computing system to rank the candidates as described, infra.

If in step 50, the computing system determines that the buyer has requested to evaluate the candidates/responses then in step 52, the buyer evaluates the supplier responses and candidates and is treated the same as the requester (i.e., during the evaluation of step 46). The buyer will not be able to see the requester evaluation or pricing until evaluation is completed. In step 54, the buyer will mark their evaluation as complete. As is step 48 for the requester, the buyer must evaluate all candidates for each category. The buyer may not go back and change their evaluation after marking it complete. After the buyer marks the evaluation as complete, the computing system will transmit a warning indicating that the evaluation will be completed and allowing the buyer to cancel the completion command or continue to mark the evaluation as complete. In step 56, a software application (e.g., software application 16a in FIG. 1) will calculate (for requester evaluation only) a score for each candidate based on the requester's rating (i.e., ranking percentages) and a price criteria after the requester finalizes the rating. Both buyer and requester may see evaluation. In the case where both the buyer and requester evaluate, the computing system will show an average of both evaluations after both the requester and buyer have finalized their score. The software application will indicate a best candidate (i.e., a highest ranked candidate) based on an overall score. In step 58, the requester will select a candidate. The requester may select any candidate(s) he/she wants (e.g., a highest ranked candidate). If the requester does not select a highest ranked candidate, he/she may be required to enter a justification for selecting a lower ranked candidate. After the requester enters his/her justification, the computing system may notify the buyer that the highest ranked candidate was not selected for the candidate request. The buyer may be required to enter a fair value analysis and approve the candidate selection. Additionally, the buyer may have the option to change the candidate selection to the highest ranked candidate. If the requester selects the highest ranked candidate initially or the buyer approves the non-highest ranked candidate, the computing system will route the request to the next process. The process ends in step 60.

Figure 3:
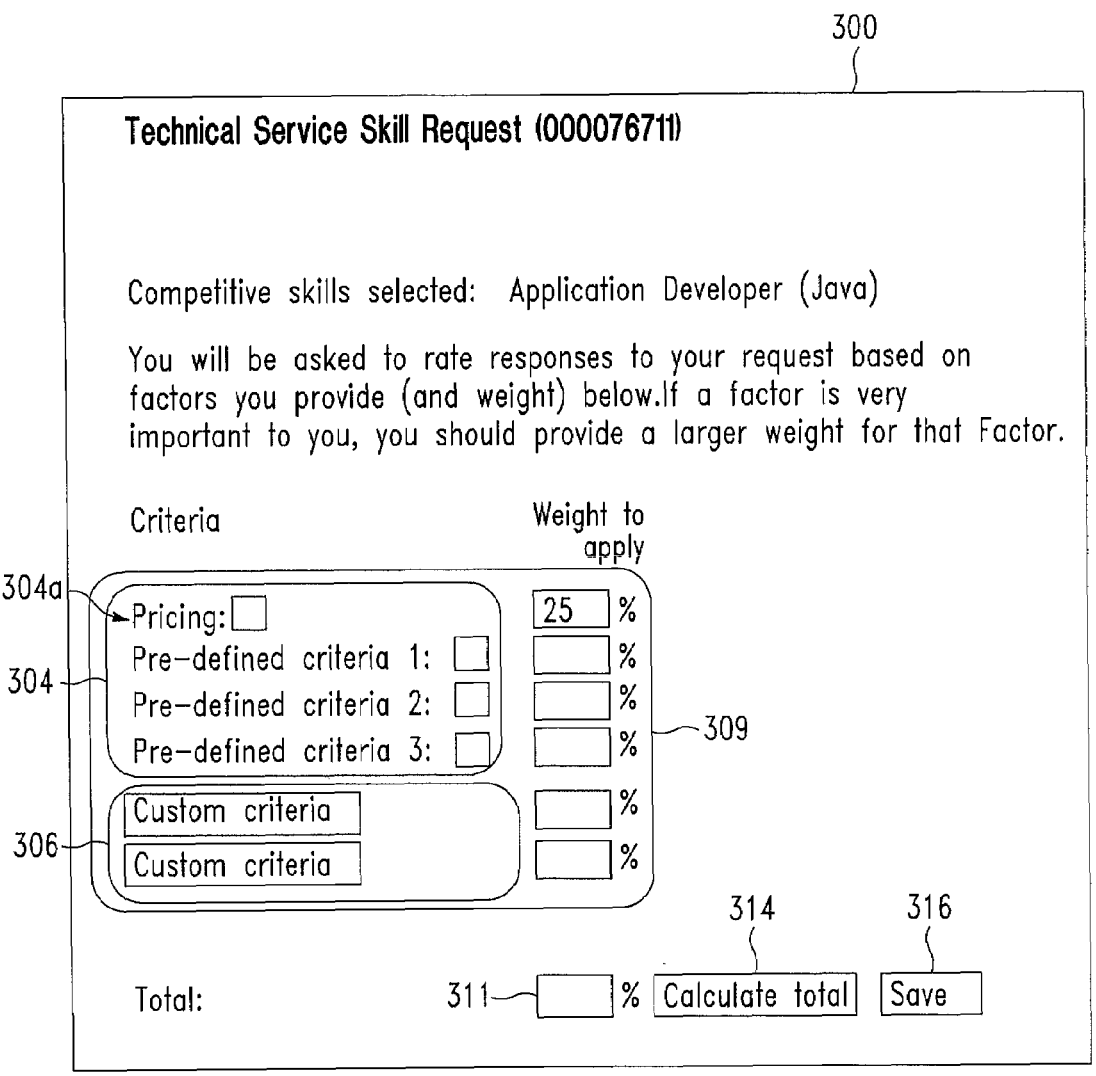
FIG. 3 illustrates an example of a first computer screen associated with the algorithm of FIG. 2, in accordance with embodiments of the present invention.

FIG. 3 illustrates an example of a computer screen shot 300 (e.g., displayed on interface terminal 8a of FIG. 1) associated with steps 30, 31, and 34 of FIG. 2, in accordance with embodiments of the present invention. In FIG. 3, the computing system determines if the requested skill is a hot skill (illustrated in FIG. 3 as a competitive skill). The computer screen shot 300 will allow the requester to view the predetermined criteria 304 associated with requested skill and allow the requester to assign ranking percentages 309 to the predetermined criteria 304. FIG. 3 also provides spaces for the user to enter up to two user defined criteria 306. When the requester enables the calculate total button 314, the computing system will calculate the total of the assign ranking percentages 309. The computing system will ensure that:
1. All numbers (i.e., ranking percentages 309) entered are whole numbers.
2. Pricing criteria 304a is at least 25%.
3. A total 311 adds up to 100%.

A warning message will be displayed if any of the above is not satisfied. When a save button is enabled (i.e., on interface terminal 8a of FIG. 1), the selected percentage and additional requester criteria will be saved in memory device 14a.

FIG. 4 is an example of a modified (i.e., from screen shot 300 of FIG. 3) computer screen shot 400 (e.g., displayed on interface terminal 8a of FIG. 1) associated with steps 30, 31, 34, 36, and 37 of FIG. 2, in accordance with embodiments of the present invention. In FIG. 4, the computing system emails a buyer and informs the buyer that he/she will be an evaluator of the request for the candidate selection unless he/she indicates otherwise using buyer evaluation button 415. Additionally, FIG. 4 illustrates applied ranking percentages 409 and a total 411.

FIG. 5 illustrates an example of a computer screen shot 500 (e.g., displayed on interface terminal 8a of FIG. 1) associated with step 46 of FIG. 2, in accordance with embodiments of the present invention. In FIG. 5, the computing system will display the service detail for the selected skill. When the requester clicks on one of the candidates or the respective rating, the computing system will invoke the candidate evaluation process.

FIG. 6 illustrates an example of a computer screen shot 600 (e.g., displayed on interface terminal 8a of FIG. 1), in accordance with embodiments of the present invention. In FIG. 6, the computing system determines that the evaluation for the response is not marked complete for the invoking user (requester, delegate or buyer) and the computing system will enable the user to assign scores (from 1 to 10) for each of the evaluation criteria for each candidate response received from the supplier. If the evaluation is marked completed by the invoking user, the dropdown 602 will be replaced by the actual score from a database. When the user clicks on the candidate's resume link 605, the system will display the candidate's resume. The user may select 1-10 from the dropdown 602 for each competitive bid question 604. When the user clicks save and return button 601, the computing system will insure that all questions have been scored.

FIG. 7 illustrates an example of a computer screen shot 700 (e.g., displayed on interface terminal 8a of FIG. 1) associated with step 52 of FIG. 2, in accordance with embodiments of the present invention. In FIG. 7, the computing system invokes a candidate evaluation process and enables the buyer to assign scores (from 1 to 10) for each of the evaluation criteria for each candidate response received from the supplier. When all the candidates have been scored, the finalize button 704 will become active. When the buyer enables the finalize button 704, the computing system will display a warning message to the buyer that he/she may not change the answers once the evaluation has been finalized.

FIG. 8 illustrates an example of a computer screen shot 800 (e.g., displayed on interface terminal 8a of FIG. 1) associated with step 56 and 58 of FIG. 2, in accordance with embodiments of the present invention. In FIG. 8, the computing system displays the ranked candidates for the buyer to select a candidate.

FIG. 9 illustrates an example of a computer screen shot 900 (e.g., displayed on interface terminal 8a of FIG. 1) associated with step 56 and 58 of FIG. 2, in accordance with embodiments of the present invention. In FIG. 9, the computing system displays the ranked candidates for the requester to select a candidate.

FIGS. 10-16 illustrate an example of implementation for the system 2 of FIG. 1 for ranking candidates, in accordance with embodiments of the present invention.

FIG. 10 illustrates an example of a computer screen shot 123 (e.g., displayed on interface terminal 8a of FIG. 1) associated with screen shot 300 of FIG. 3, in accordance with embodiments of the present invention. In FIG. 10, a requester has assigned ranking percentages 130 to predetermined criteria 135 and requester selected criteria 140.

FIG. 11 illustrates an example of a computer screen shot 145 (e.g., displayed on interface terminal 8a of FIG. 1) similar to computer screen shot 123 of FIG. 10. In contrast to computer screen shot 123 of FIG. 10, computer screen shot 145 of FIG. 11 is displayed for a buyer.

FIG. 12 illustrates an example of a computer screen shot 148 (e.g., displayed on interface terminal 8b of FIG. 1) displayed for a supplier, in accordance with embodiments of the present invention. In FIG. 12, predetermined criteria 149 are displayed for the supplier and the supplier provides responses 151.

FIG. 13 illustrates an example of a computer screen shot 150 (e.g., displayed on interface terminal 8a of FIG. 1) displayed for the requester and/or buyer for evaluation, in accordance with embodiments of the present invention.

FIG. 14 illustrates an example of a computer screen shot 158 (e.g., displayed on interface terminal 8a of FIG. 1) displayed for the requester if the buyer does not participate in the evaluation, in accordance with embodiments of the present invention.

FIG. 15 illustrates an example of a computer screen shot 163 (e.g., displayed on interface terminal 8a of FIG. 1) displayed for the requester to finalize the process in order to receive ranked candidates, in accordance with embodiments of the present invention.

FIG. 16 illustrates an example of a finalized computer screen shot 168 (e.g., displayed on interface terminal 8a of FIG. 1) a final list of ranked candidates, in accordance with embodiments of the present invention.

Figure 17:
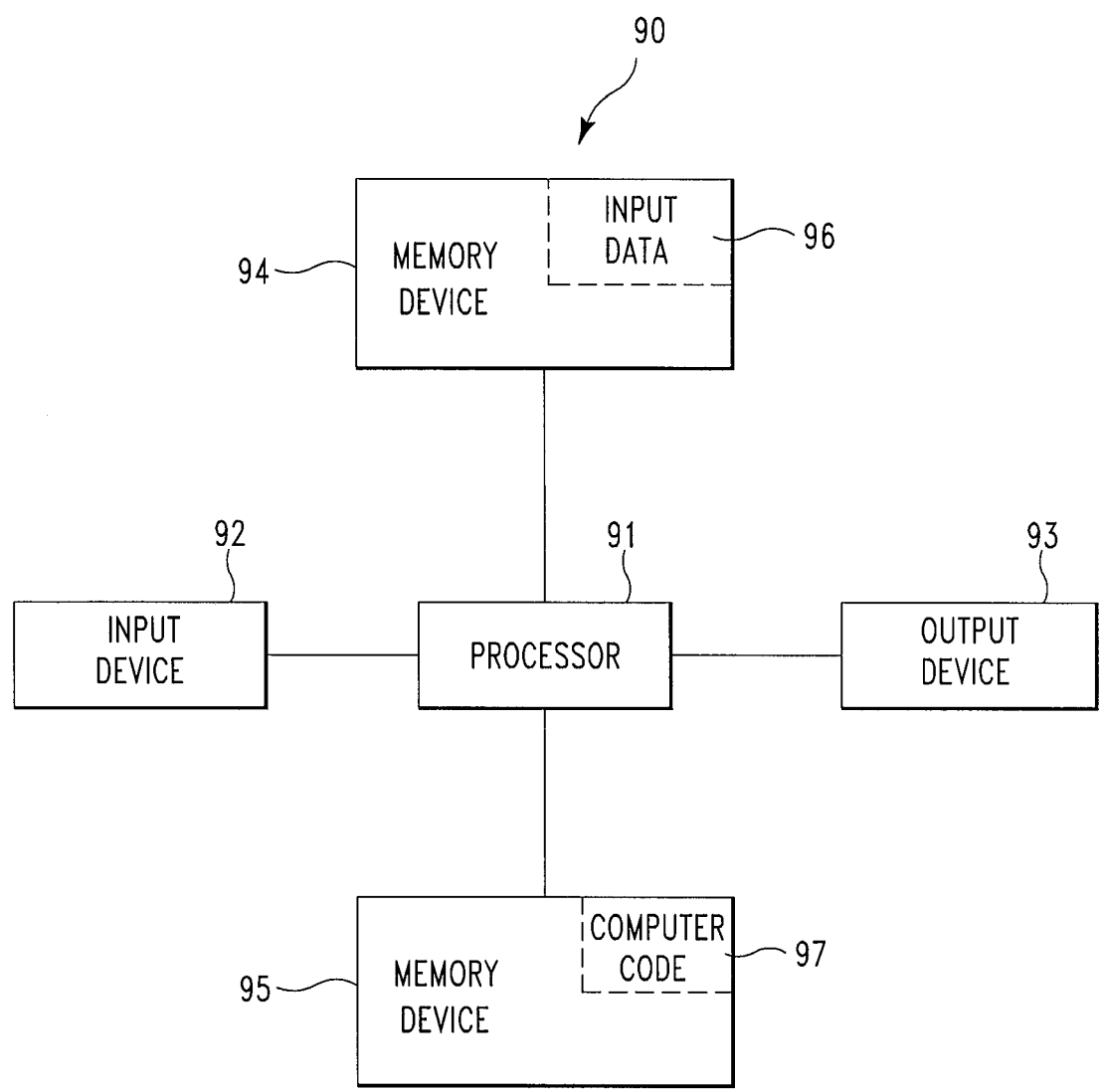
FIG. 17 illustrates a computer system used for ranking candidates, in accordance with embodiments of the present invention.

FIG. 17 illustrates a computer system 90 (i.e., computing system 4a and/or 4b in FIG. 1) used for ranking candidates, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithm of FIG. 2) for ranking candidates. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 17) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to assign authorization roles to different locations (e.g., countries) or portions of an organization and determine a routing entity for each authorization role/location combination. Thus the present invention discloses a process for deploying or integrating computing infrastructure, comprising integrating computer-readable code into the computer system 90, wherein the code in combination with the computer system 90 is capable of performing a method for ranking candidates. In another embodiment, the invention provides a business method that performs the process steps of the invention on a subscription, advertising, and/or fee basis. That is, a service provider, such as a Solution Integrator, could offer to rank candidates. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 17 shows the computer system 90 as a particular configuration of hardware and software, any configuration of hardware and software, as would be known to a person of ordinary skill in the art, may be utilized for the purposes stated supra in conjunction with the particular computer system 90 of FIG. 17. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A ranking method comprising:

presenting, by a computing system, a first list of candidate skills to a first user, said computing system comprising a memory device, said memory device comprising said first list and a second list of predetermined criteria, at least one predetermined criteria of said second list associated with each candidate skill of said first list;

first receiving from said first user, by said computing system, a selection of a first candidate skill from said first list;

presenting to said first user in response to said first receiving, by said computing system, a first group of predetermined criteria from said second list, said first group associated with said first candidate skill;

second receiving from said first user, by said computing system, first assigned ranking percentage data associated with said first group of predetermined criteria;

generating, by said computing system, a third list comprising portions of said first assigned ranking percentage data assigned to each predetermined criteria of said first group of predetermined criteria, wherein said third list further comprises said first group of predetermined criteria;

transmitting, by said computing system, said third list to a second user;

first receiving from said second user, by said computing system, a fourth list of candidates and responses to each said predetermined criteria of said first group, each candidate of said fourth list associated with said first group of predetermined criteria of said third list;

presenting, by said computing system, said fourth list to said first user;

third receiving from said first user, by said computing system, first evaluation data related to said responses to each said predetermined criteria of said first group;

ranking, by said computing system, said candidates of said fourth list, said ranking based on said first assigned ranking percentage data and said first evaluation data, wherein said ranking comprises calculating ranking scores (RS) for said candidates from said fourth list;

generating, by said computing system, an average score comprising an average of said ranking scores (RS); and presenting, by said computing system to said first user, said average score.

2. The method of claim 1, further comprising:

fourth receiving from said first user, by said computing system, user specified criteria data associated with each said candidate skill of said first list and second assigned ranking percentage data associated with said user specified criteria data, wherein said third list further comprises said user specified criteria data and said second assigned ranking percentage data, and wherein said ranking is further based on said second assigned ranking percentage data.

3. The method of claim 1, further comprising:

fourth receiving from said first user, by said computing system, time related data specifying a due date for said computing system to receive said fourth list, wherein said fourth receiving said fourth list comprises fourth receiving said fourth list by said due date.

4. The method of claim 1, further comprising:

first receiving from a third user, by said computing system, second assigned ranking percentage data associated with said first group of predetermined criteria, wherein said ranking is further based on said second assigned ranking percentage data.

5. The method of claim 4, further comprising:

second receiving from said third user, by said computing system, second evaluation data related to said responses, wherein said ranking is further based on said second evaluation data.

6. The method of claim 1, further comprising:

fourth receiving from said first user, by said computing system, a completion command indicating that said computing system is ready to proceed with said ranking, wherein said computing system is adapted to transmit a warning message to said first user after said fourth receiving if said user attempts to modify said first assigned ranking percentage data.

7. The method of claim 1, wherein said first group of predetermined criteria further comprises a pricing criteria associated with said first candidate skill, and wherein said method further comprises:

evaluating, by said computing system, said pricing criteria for each candidate of said fourth list, wherein said ranking is further based on results of said evaluating.

8. The method of claim 1, further comprising:

fourth receiving from said first user, by said computing system, a selection for a first candidate of said candidates of said fourth list, wherein said first candidate is not a highest ranked candidate with respect to each other candidate of said candidates;

fifth receiving from said first user, by said computing system, a justification data justifying said selection for said first candidate; and receiving from a third user, by said computing system, a command associated with said selection for said first candidate.

9. The method of claim 1, wherein said first group of predetermined criteria comprises criteria selected from the group consisting of oral communication skills, project experience, security clearances, teamwork skills, and a willingness to travel.

10. The method of claim 1, further comprising:

determining, by said computing system, that a competitive bid process is configured hiring said candidates of said fourth list, wherein said competitive bid process is configured based on a country/commodity code and a hot skill configuration.

11. The method of claim 1, further comprising:

calculating, by said computing system, a standard deviation, wherein said standard deviation equals a square root of a (sum of $(x-M)2/N-1$), wherein x equals a bill rate, wherein M equals a mean of all candidates of said fourth list bill rates, and wherein N equals a number of candidate responses received for a specified skill request;

calculating, by said computing system, scores, wherein each score of said scores equals 10—an integer of ((x-minimum of (all x)) divided by said standard deviation);

calculating, by said computing system, price ratings, wherein each price rating of said price ratings equals each said score multiplied by a pricing percentage; and calculating, by said computing system, average ratings, wherein each average rating of said average ratings equals an average of (a requester rating, a buyer rating, an a technical coordinator rating) plus each said price rating, and wherein said ranking is further based on said average ratings.

12. A computing system comprising a processor coupled to a computer-readable memory unit, said memory unit comprising a first list of candidate skills, a second list of predetermined criteria, and instructions that when executed by the processor implement a ranking method, at least one predetermined criteria of said second list associated with each candidate skill of said first list, said method comprising:

presenting, by said computing system, said first list of candidate skills to a first user;

first receiving from said first user, by said computing system, a selection of a first candidate skill from said first list;

presenting to said first user in response to said first receiving, by said computing system, a first group of predetermined criteria from said second list, said first group associated with said first candidate skill;

second receiving from said first user, by said computing system, first assigned ranking percentage data associated with said first group of predetermined criteria;

generating, by said computing system, a third list comprising portions of said first assigned ranking percentage data assigned to each predetermined criteria of said first group of predetermined criteria, wherein said third list further comprises said first group of predetermined criteria;

transmitting, by said computing system, said third list to a second user;

first receiving from said second user, by said computing system, a fourth list of candidates and responses to each said predetermined criteria of said first group, each candidate of said fourth list associated with said first group of predetermined criteria of said third list;

presenting, by said computing system, said fourth list to said first user;

third receiving from said first user, by said computing system, first evaluation data related to said responses to each said predetermined criteria;

ranking, by said computing system, said candidates of said fourth list, said ranking based on said first assigned ranking percentage data and said first evaluation data, wherein said ranking comprises calculating ranking scores (RS) for said candidates from said fourth list;

generating, by said computing system, an average score comprising an average of said ranking score (RS); and presenting, by said computing system to said first user, said average score.

13. The computing system of claim 12, wherein said method further comprises:

fourth receiving from said first user, by said computing system, user specified criteria data associated with each said candidate skill of said first list and second assigned ranking percentage data associated with said user specified criteria data, wherein said third list further comprises said user specified criteria data and said second assigned ranking percentage data, and wherein said ranking is further based on said second assigned ranking percentage data.

14. The computing system of claim 12, wherein said method further comprises:

fourth receiving from said first user, by said computing system, time related data specifying a due date for said computing system to receive said fourth list, wherein said fourth receiving said fourth list comprises fourth receiving said fourth list by said due date.

15. The computing system of claim 12, wherein said method further comprises:

first receiving from a third user, by said computing system, second assigned ranking percentage data associated with said first group of predetermined criteria, wherein said ranking is further based on said second assigned ranking percentage data.

16. The computing system of claim 15, wherein said method further comprises:

second receiving from said third user, by said computing system, second evaluation data related to said responses, wherein said ranking is further based on said second evaluation data.

17. The computing system of claim 12, wherein said method further comprises:

fourth receiving from said first user, by said computing system, a completion command indicating that said computing system is ready to proceed with said ranking, wherein said computing system is adapted to transmit a warning message to said first user after said fourth receiving if said user attempts to modify said first assigned ranking percentage data.

18. The computing system of claim 12, wherein said first group of predetermined criteria further comprises a pricing criteria associated with said first candidate skill, and wherein said method further comprises:

evaluating, by said computing system, said pricing criteria for each candidate of said fourth list, wherein said ranking is further based on results of said evaluating.

19. The computing system of claim 12, wherein said method further comprises:

fourth receiving from said first user, by said computing system, a selection for a first candidate of said candidates of said fourth list, wherein said first candidate is not a highest ranked candidate with respect to each other candidate of said candidates;

fifth receiving from said first user, by said computing system, a justification data justifying said selection for said first candidate; and receiving from a third user, by said computing system, a command associated with said selection for said first candidate.

20. A computer program product, comprising a computer usable medium comprising a first list of candidate skills, a second list of predetermined criteria, and a computer readable program code embodied therein, at least one predetermined criteria of said second list associated with each candidate skill of said first list, said computer readable program code adapted to implement a ranking method within a computing system, said method comprising:

presenting, by said computing system, said first list of candidate skills to a first user;

first receiving from said first user, by said computing system, a selection of a first candidate skill from said first list;

presenting to said first user in response to said first receiving, by said computing system, a first group of predetermined criteria from said second list, said first group associated with said first candidate skill;

second receiving from said first user, by said computing system, first assigned ranking percentage data associated with said first group of predetermined criteria;

generating, by said computing system, a third list comprising portions of said first assigned ranking percentage data assigned to each predetermined criteria of said first group of predetermined criteria, wherein said third list further comprises said first group of predetermined criteria;

transmitting, by said computing system, said third list to a second user;

first receiving from said second user, by said computing system, a fourth list of candidates and responses to each said predetermined criteria of said first group, each candidate of said fourth list associated with said first group of predetermined criteria of said third list;

presenting, by said computing system, said fourth list to said first user;

third receiving from said first user, by said computing system, first evaluation data related to said responses to each said predetermined criteria of said first group;

ranking, by said computing system, said candidates of said fourth list, said ranking based on said first assigned ranking percentage data and said first evaluation data, wherein said ranking comprises calculating ranking scores (RS) for said candidates from said fourth list;

generating, by said computing system, an average score comprising an average of said ranking scores (RS); and presenting, by said computing system to said first user, said average score.

21. The computer program product of claim 20, wherein said method further comprises:

fourth receiving from said first user, by said computing system, user specified criteria data associated with each said candidate skill of said first list and second assigned ranking percentage data associated with said user specified criteria data, wherein said third list further comprises said user specified criteria data and said second assigned ranking percentage data, and wherein said ranking is further based on said second assigned ranking percentage data.

22. The computer program product of claim 20, wherein said method further comprises:

fourth receiving from said first user, by said computing system, time related data specifying a due date for said computing system to receive said fourth list, wherein said computing system receives said fourth list by said due date, wherein said receiving said fourth list comprises fourth receiving said fourth list by said due date.

23. The computer program product of claim 20, wherein said method further comprises:
first receiving from a third user, by said computing system, second assigned ranking percentage data associated with said first group of predetermined criteria, wherein said ranking is further based on said second assigned ranking percentage data.

24. The computer program product of claim 23, wherein said method further comprises:
second receiving from said third user, by said computing system, second evaluation data related to said responses, wherein said ranking is further based on said second evaluation data.

25. The computer program product of claim 20, wherein said method further comprises:
fourth receiving from said first user, by said computing system, a completion command indicating that said computing system is ready to proceed with said ranking, wherein said computing system is adapted to transmit a warning message to said first user after said fourth receiving if said user attempts to modify said first assigned ranking percentage data.

26. The computer program product of claim 20, wherein said first group of predetermined criteria further comprises a pricing criteria associated with said first candidate skill, and wherein said method further comprises:
evaluating, by said computing system, said pricing criteria for each candidate of said fourth list, wherein said ranking is further based on results of said evaluating.

27. The computer program product of claim 20, wherein said method further comprises:
fourth receiving from said first user, by said computing system, a selection for a first candidate of said candidates of said fourth list, wherein said first candidate is not a highest ranked candidate with respect to each other candidate of said candidates;
fifth receiving from said first user, by said computing system, a justification data justifying said selection for said first candidate; and
receiving from a third user, by said computing system, a command associated with said selection for said first candidate.

28. A process for supporting computer infrastructure, said process comprising providing at least one support service for at least one of creating, integrating, hosting, maintaining, and deploying computer-readable code in a computing system comprising a memory unit, said memory unit comprising a first list of candidate skills and a second list of predetermined criteria, at least one predetermined criteria of said second list associated with each candidate skill of said first list, wherein the code in combination with the computing system is capable of performing a ranking method, said method comprising:
presenting, by said computing system, said first list of candidate skills to a first user;
first receiving from said first user, by said computing system, a selection of a first candidate skill from said first list;
presenting to said first user in response to said first receiving, by said computing system, a first group of predetermined criteria from said second list, said first group associated with said first candidate skill;
second receiving from said first user, by said computing system, first assigned ranking percentage data associated with said first group of predetermined criteria;
generating, by said computing system, a third list comprising portions of said first assigned ranking percentage data assigned to each predetermined criteria of said first group of predetermined criteria, wherein said third list further comprises said first group of predetermined criteria;
transmitting, by said computing system, said third list to a second user;
first receiving from said second user, by said computing system, a fourth list of candidates and responses to each said predetermined criteria of said first group, each candidate of said fourth list associated with said first group of predetermined criteria of said third list;
presenting, by said computing system, said fourth list to said first user;
third receiving from said first user, by said computing system, first evaluation data related to said responses to each said predetermined criteria of said first group;
ranking, by said computing system, said candidates of said fourth list, said ranking based on said first assigned ranking percentage data and said first evaluation data, wherein said ranking comprises calculating ranking scores (RS) for said candidates from said fourth list;
generating, by said computing system, an average score comprising an average of said ranking scores (RS); and
presenting, by said computing system to said first user, said average score.

29. The process of claim 28, wherein said method further comprises:
fourth receiving from said first user, by said computing system, user specified criteria data associated with each said candidate skill of said first list and second assigned ranking percentage data associated with said user specified criteria data, wherein said third list further comprises said user specified criteria data and said second assigned ranking percentage data, and wherein said ranking is further based on said second assigned ranking percentage data.

30. The process of claim 28, wherein said method further comprises:
fourth receiving from said first user, by said computing system, time related data specifying a due date for said computing system to receive said fourth list, wherein said fourth receiving said fourth list comprises fourth receiving said fourth list by said due date.

31. The process of claim 28, wherein said method further comprises:
first receiving from a third user, by said computing system, second assigned ranking percentage data associated with said first group of predetermined criteria, wherein said ranking is further based on said second assigned ranking percentage data.

32. The process of claim 31, wherein said method further comprises:
second receiving from said third user, by said computing system, second evaluation data related to said responses, wherein said ranking is further based on said second evaluation data.

33. The process of claim 28, wherein said method further comprises:
fourth receiving from said first user, by said computing system, a completion command indicating that said computing system is ready to proceed with said ranking, wherein said computing system is adapted to transmit a warning message to said first user after said fourth receiving if said user attempts to modify said first assigned ranking percentage data.

34. The process of claim 28, wherein said first group of predetermined criteria further comprises a pricing criteria associated with said first candidate skill, and wherein said method further comprises:

evaluating, by said computing system, said pricing criteria for each candidate of said fourth list, wherein said ranking is further based on results of said evaluating.

35. The process of claim 28, wherein said method further comprises:

fourth receiving from said first user, by said computing system, a selection for a first candidate of said candidates of said fourth list, wherein said first candidate is not a highest ranked candidate with respect to each other candidate of said candidates;

fifth receiving from said first user, by said computing system, a justification data justifying said selection for said first candidate; and receiving from a third user, by said computing system, a command associated with said selection for said first candidate.

* * * * *